(12) United States Patent
Guymon

(10) Patent No.: US 9,695,958 B2
(45) Date of Patent: Jul. 4, 2017

(54) OFFSHORE HORIZONTAL PRODUCT LAY ARRANGEMENT

(71) Applicant: J. Ray McDermott, S.A., Houston, TX (US)

(72) Inventor: David Lee Guymon, Idaho Falls, ID (US)

(73) Assignee: J. RAY MCDERMOTT, S.A., Houston, TX (US)

( * ) Notice: Subject to any disclaimer, the term of this patent is extended or adjusted under 35 U.S.C. 154(b) by 110 days.

(21) Appl. No.: 14/589,112

(22) Filed: Jan. 5, 2015

(65) Prior Publication Data
US 2015/0125216 A1    May 7, 2015

Related U.S. Application Data

(63) Continuation-in-part of application No. 13/548,316, filed on Jul. 13, 2012, now abandoned.

(51) Int. Cl.
*F16L 1/12* (2006.01)
*F16L 1/20* (2006.01)
*F16L 1/19* (2006.01)

(52) U.S. Cl.
CPC ............... *F16L 1/205* (2013.01); *F16L 1/19* (2013.01)

(58) Field of Classification Search
USPC ...... 405/166, 154.1, 158, 168.1, 168.3, 169; 242/615.1, 615.3; 254/334–336, 338
See application file for complete search history.

(56) References Cited

U.S. PATENT DOCUMENTS

| | | | | |
|---|---|---|---|---|
| 3,136,529 A | * | 6/1964 | Dickinson | B63B 35/04 114/244 |
| 6,352,388 B1 | * | 3/2002 | Seguin | B63B 35/03 405/166 |
| 2008/0170911 A1 | * | 7/2008 | Snowdon | B63B 35/03 405/166 |

FOREIGN PATENT DOCUMENTS

| | | |
|---|---|---|
| EP | 1696163 A1 | 8/2006 |
| WO | 2005/095835 A1 | 10/2005 |
| WO | 2007/108673 A1 | 9/2007 |
| WO | 2012/091556 A1 | 7/2012 |

* cited by examiner

*Primary Examiner* — Sean Andrish
(74) *Attorney, Agent, or Firm* — Patterson & Sheridan, LLP

(57) ABSTRACT

An arrangement that brings all of the separate elements of equipment used to lay product offshore such as pipe, umbilicals and power cables and assembles them into a single device that can be installed on a vessel of opportunity is described. A base is used for mounting, integration, and installation of the separate elements onto a vessel. The base receives a movable lay chute, an apparatus for moving and stabilizing the lay chute, a movable hang off clamp and work table, a movable access platform, a product support arm and wheel, and a fixed chute.

11 Claims, 14 Drawing Sheets

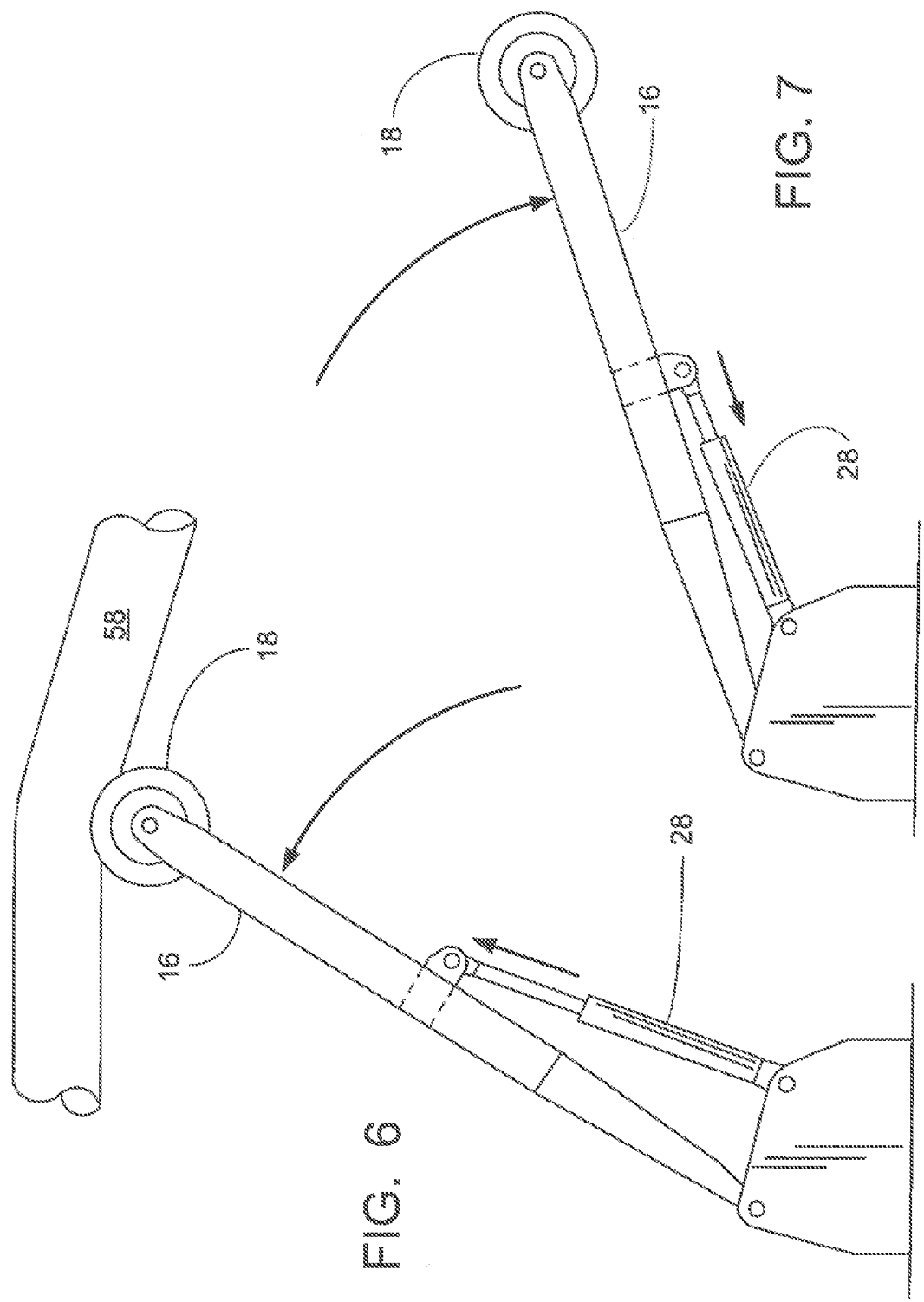

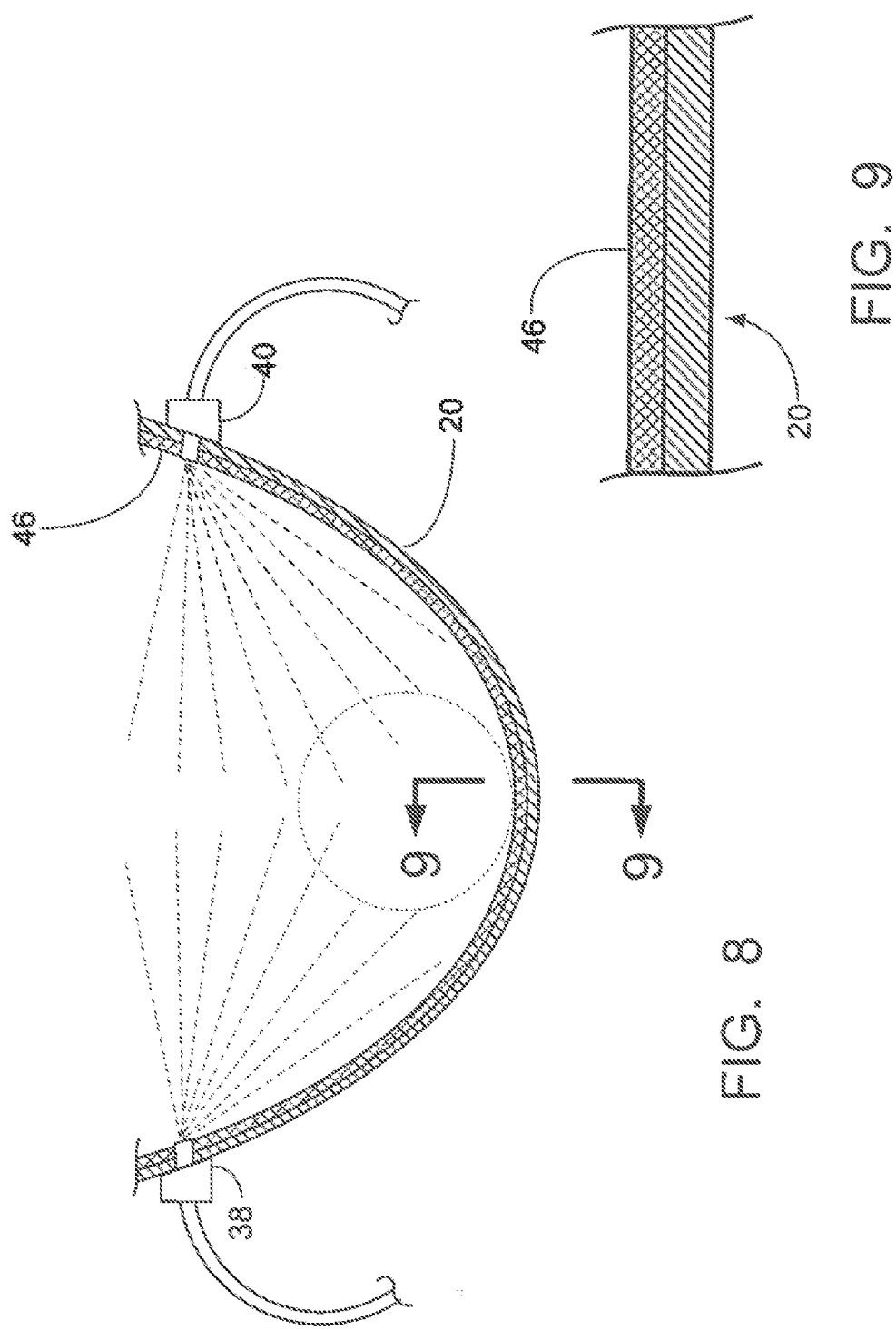

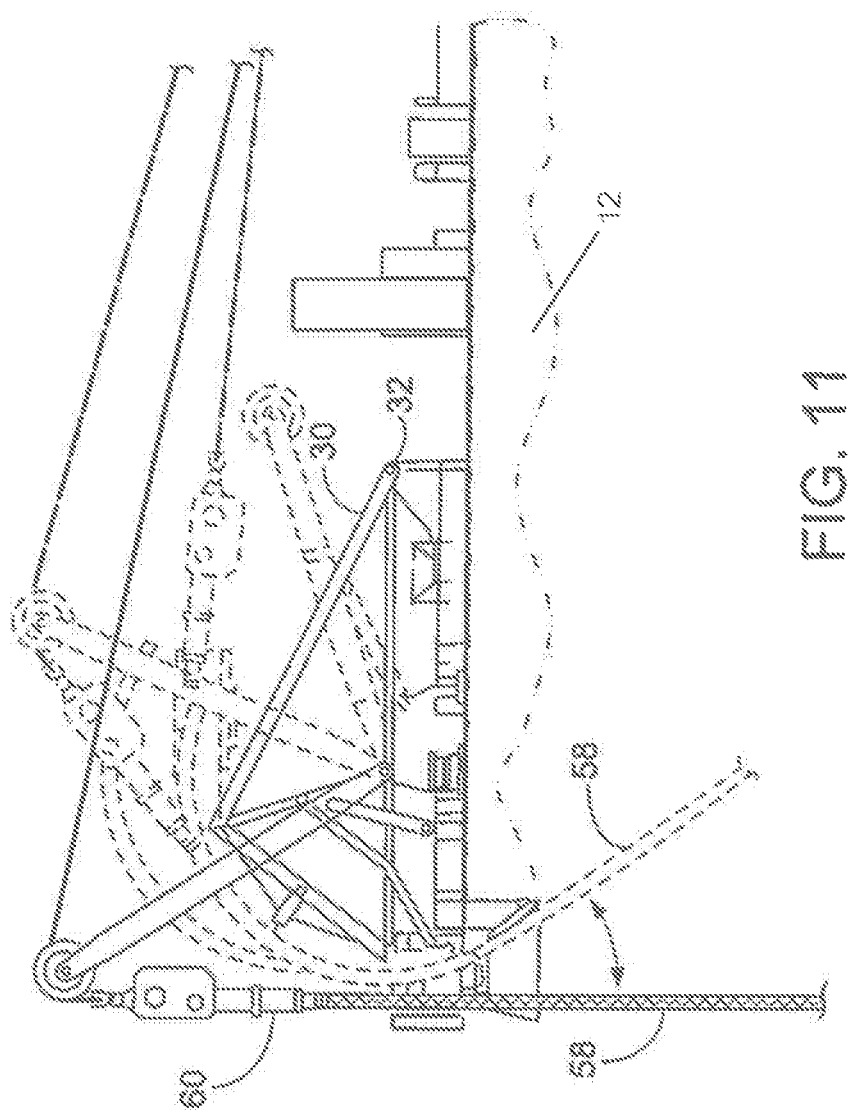
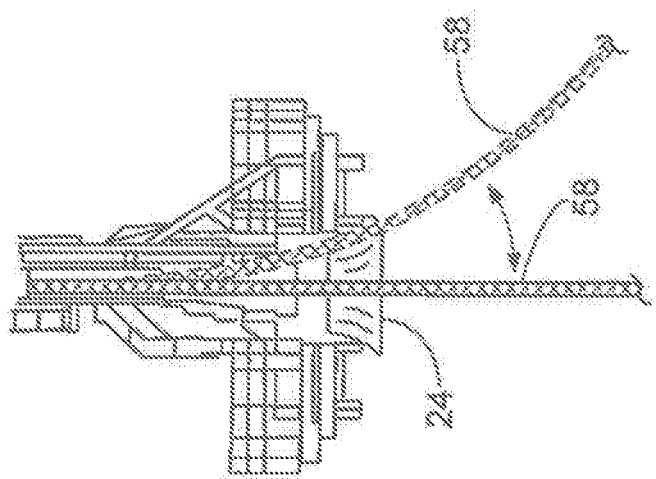

OFFSHORE HORIZONTAL PRODUCT LAY ARRANGEMENT

RELATED APPLICATION INFORMATION

This application is a Continuation In Part Application of application Ser. No. 13/548,316 filed on Jul. 13, 2012.

FIELD AND BACKGROUND OF INVENTION

The invention is generally related to laying of product offshore and more particularly to an arrangement for laying products such as pipe, umbilical lines (umbilicals), and power cables.

A-frames, cranes, and chutes have been used in the past to overboard end terminations of flexible pipes, umbilicals, and power cables (referred to hereinafter as products). In the prior art, these structures have all been separate pieces of equipment and not known to be fully integrated together as a single unit.

The separate pieces of equipment and their function are briefly discussed below.

In the most general terms, a vessel is used to transport products to an offshore location where they are to be installed. A tension machine or reel drive arrangement will support the tension generated from the self weight of the product spanning from the installation vessel down to the seabed or between the installation vessel and another fixed or floating platform where the product is being installed to or from.

A chute is used to control the bend radius of the product during laying operations, and is the means of redirecting the product from a generally horizontal plane, over the side (any side including stern), and into the water in a generally vertical plane.

While overboarding the second end, or making connections between two products, a crane or A-frame is used to lift the end termination over the chute while maintaining tangency of the product to the chute.

A hang-off clamp work table is used to support the weight of a product hanging in catenary, while the initiating end of a subsequent product is aligned over the top of the clamped product and the two connected together in a vertical orientation below the chute. The chute is generally fixed at an elevation sufficient to make the connection above the hang-off clamp work table.

A problem with having many different parts that must work together is that the level of complexity for vessel mobilization is increased when installing and configuring all of the different parts in order to work together properly. The amount of time required for installation and configuration is also increased.

Thus, it can be seen that there is a need for an improved product laying arrangement that reduces the complexity and time required for installation and configuration.

SUMMARY OF INVENTION

The present invention addresses the shortcomings in the known art and is drawn to an arrangement that brings all of the separate elements discussed above and assembles them into a single device that can be installed on a vessel of opportunity, and includes functional improvements of each to optimize the use of the arrangement as a unit. A base is used for mounting, integration, and installation of the separate elements onto a vessel. The base receives a movable lay chute, means for moving and stabilizing the lay chute, a movable hang of clamp and work table, a movable access platform, a product support arm and wheel, and a fixed chute.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same:

FIGS. 6 and 7 illustrate the A-frame and roller being raised and lowered.

FIG. 8 is a section view of a portion of the movable chute.

FIG. 9 is the section view of the portion of the chute indicated in FIG. 8.

FIG. 10 illustrates the range of product movement through the fixed chute.

FIG. 11 is an elevation view that illustrates movement of the A-frame and roller during operation.

DESCRIPTION OF THE PREFERRED EMBODIMENTS

Figure 1:
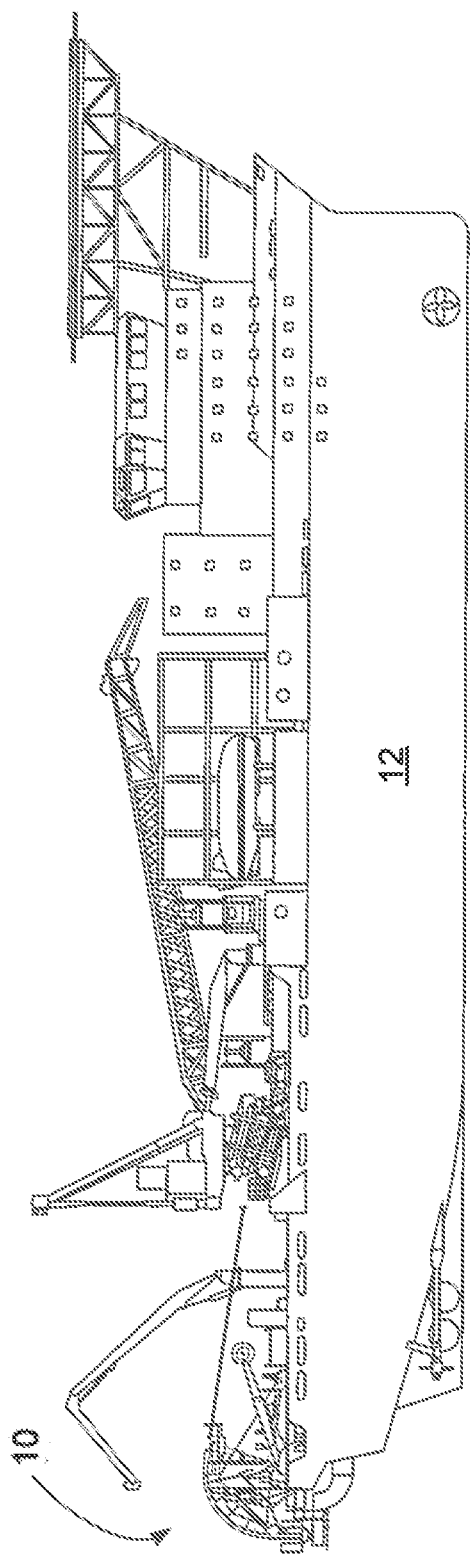
FIG. 1 is an elevation of a vessel with the product lay arrangement installed.
Figure 2:
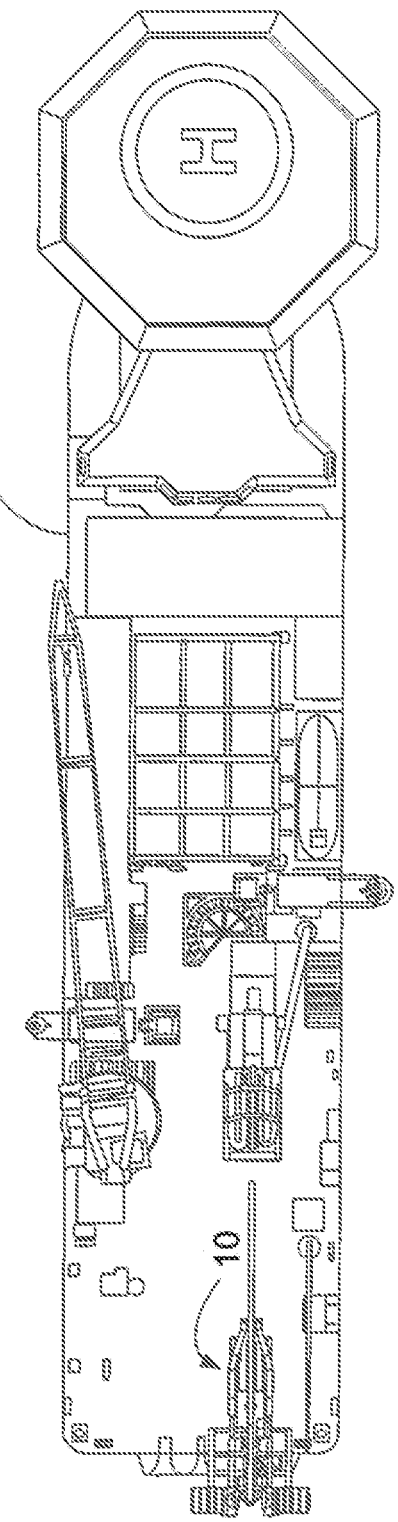
FIG. 2 is a top view of a vessel with the product lay arrangement installed.
Figure 3:
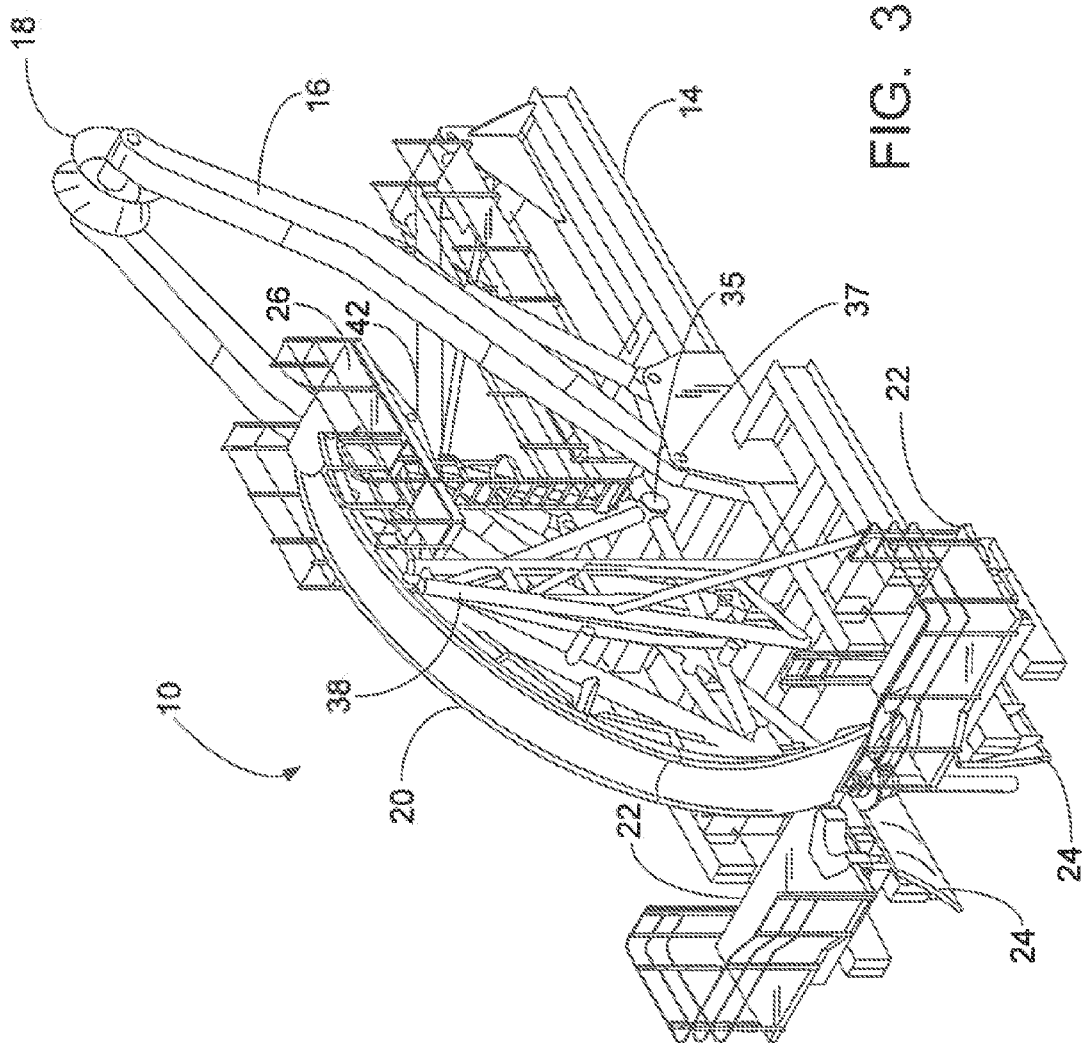
FIG. 3 is a perspective view of the product lay arrangement.
Figure 4:
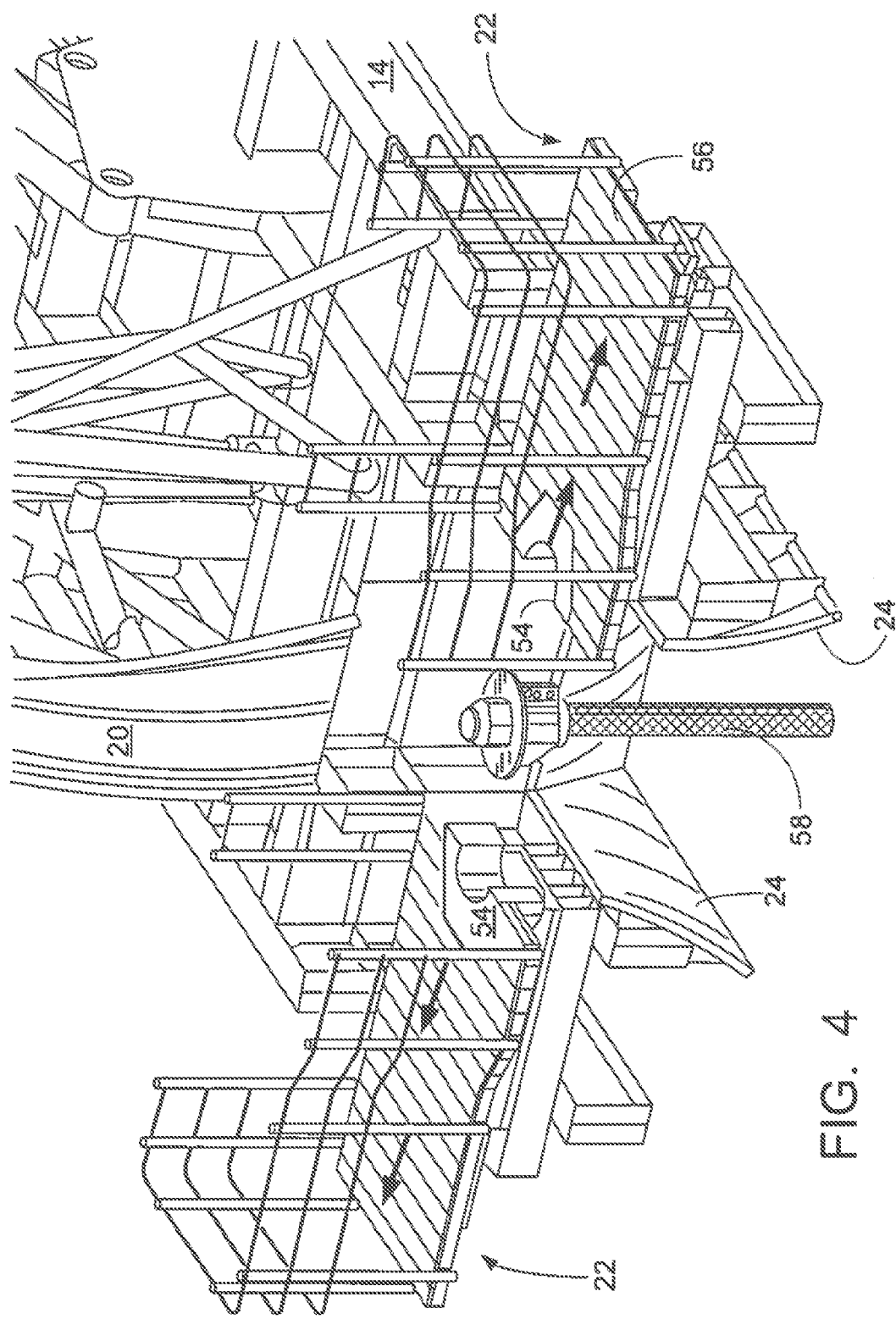
FIG. 4 is a detail view of the product lay arrangement showing the hang off clamp and work table in the open position.
Figure 5:
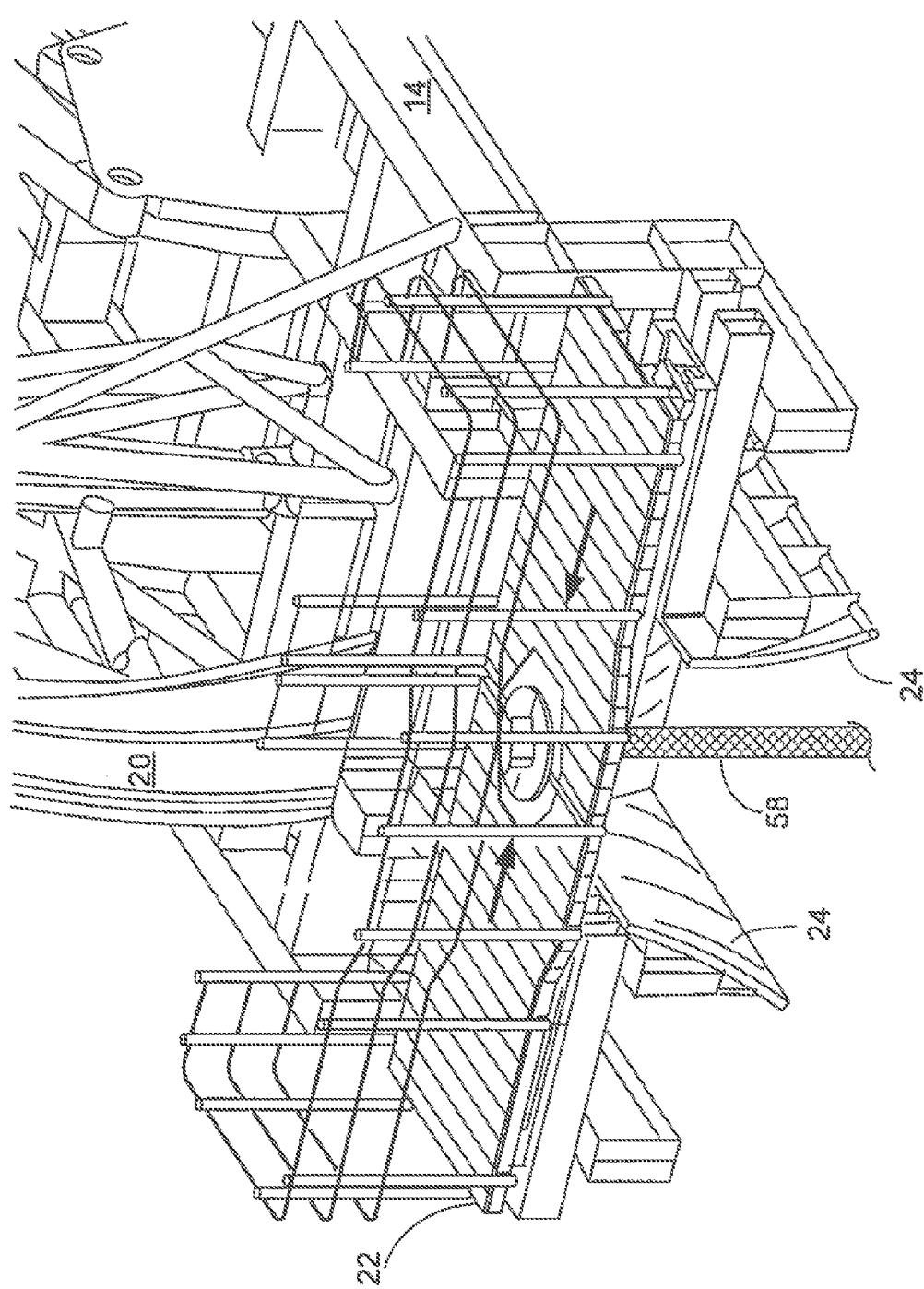
FIG. 5 is a detail view of the product lay arrangement showing the hang off clamp and work table in the closed position.

As seen in FIGS. 1 and 2 the offshore product lay arrangement 10 (referred to as "product lay arrangement" hereinafter) is installed on a vessel 12. As seen in FIG. 3, the product lay arrangement 10 includes a base 14, a movable A-frame 16 with a product support wheel 18, a movable lay chute 20, a movable hang off clamp and work table 22, a fixed chute 24, and a movable work platform 26.

As seen in FIG. 3, the base 14 and equipment thereon are designed to be self contained for ease of installation onto a vessel, as seen in FIGS. 1 and 2, as well as removal when the product lay arrangement 10 is no longer required on a particular vessel or needed on a different vessel. The base 14 and equipment thereon are formed from a suitable material such as steel. The base 14 is the structural support that distributes the weight and operation loads of the invention onto the working deck of the vessel 12 and is designed for a balanced and fully assembled lift of the invention onto or off of a vessel. The base 14 controls the spacing of all components and aligns them for safe and optimal performance.

Figure 12:
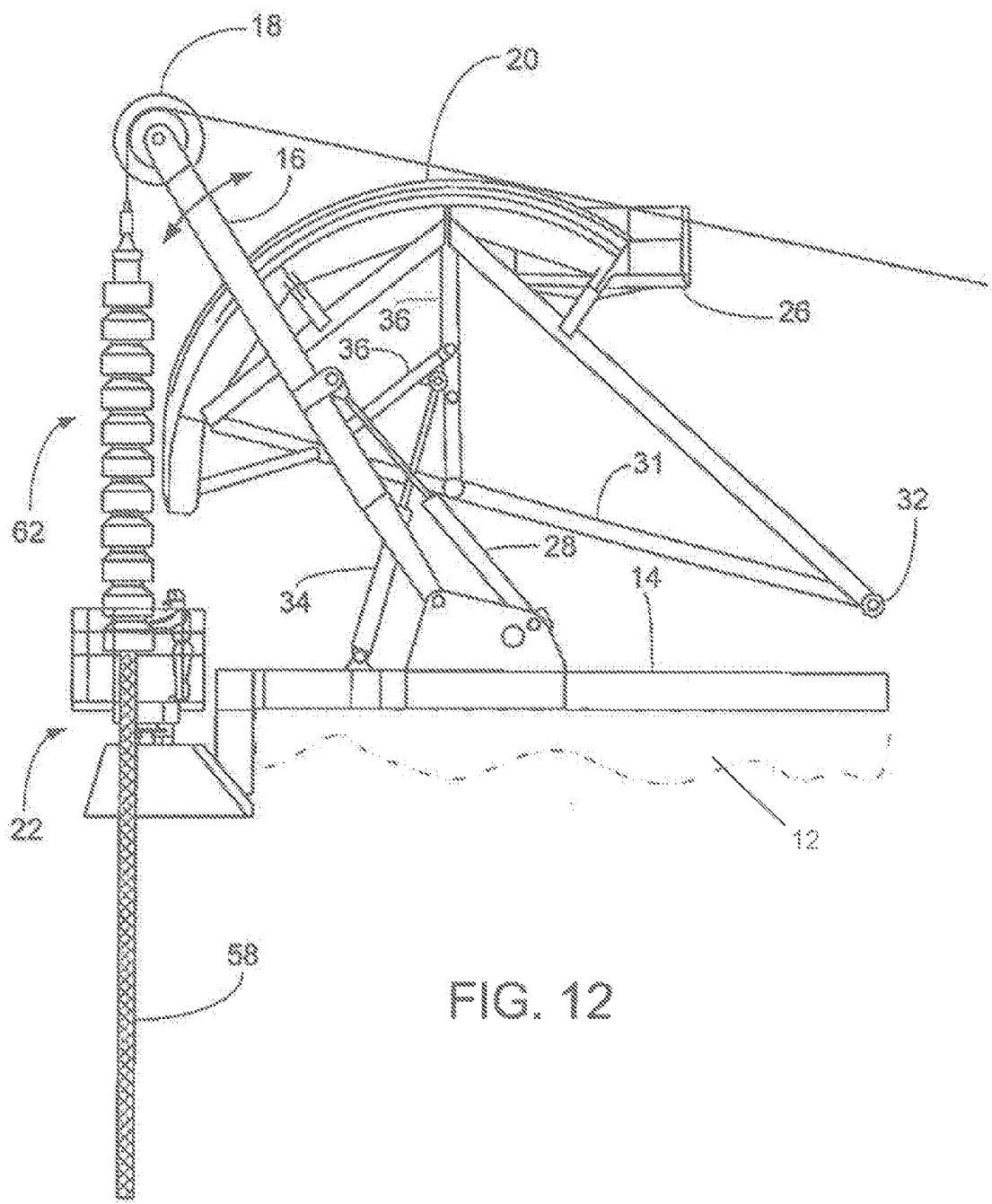
FIGS. 12-16 schematically illustrate operations during handling and installation of bend restrictors.
Figure 13:
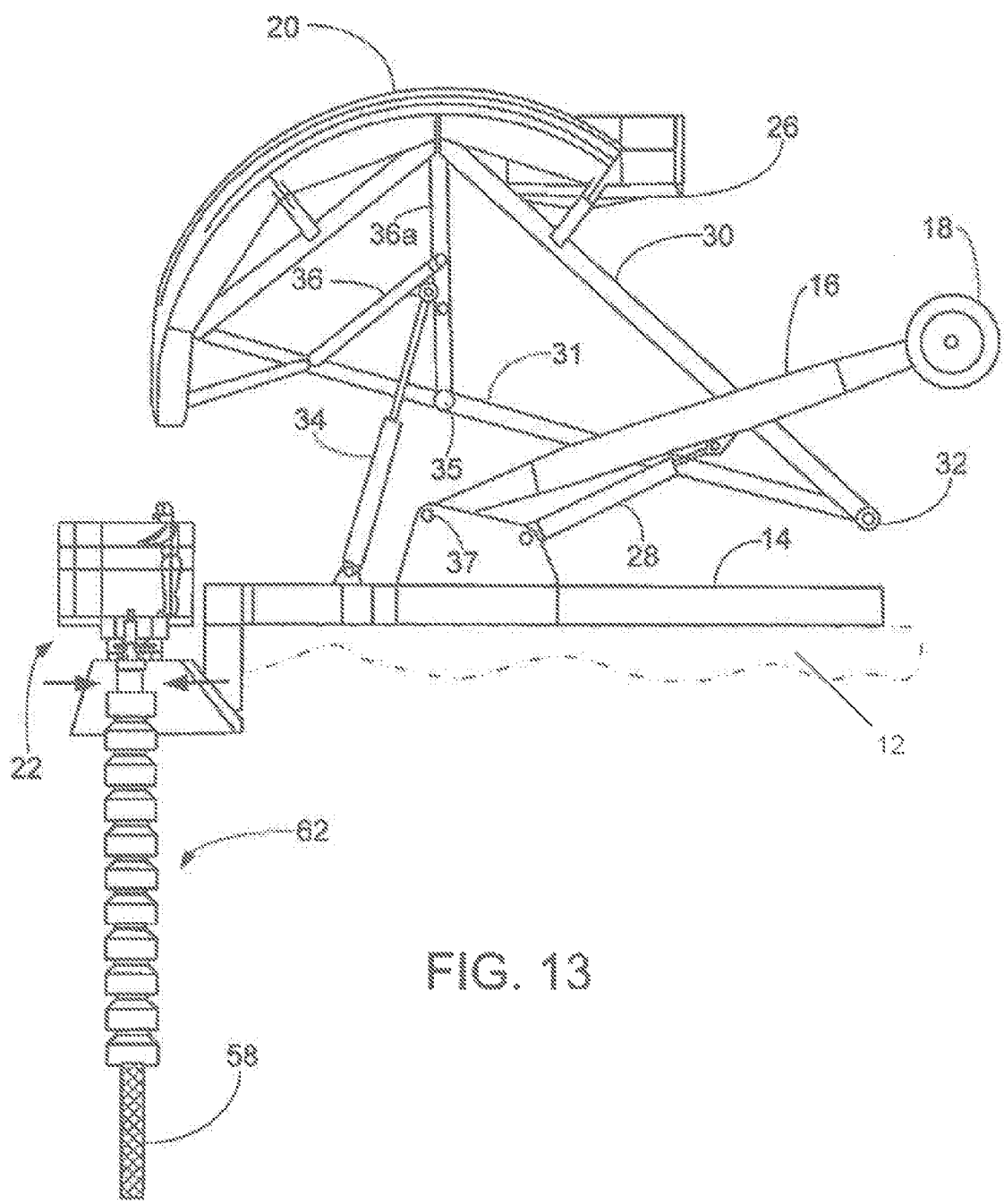
Figure 15:
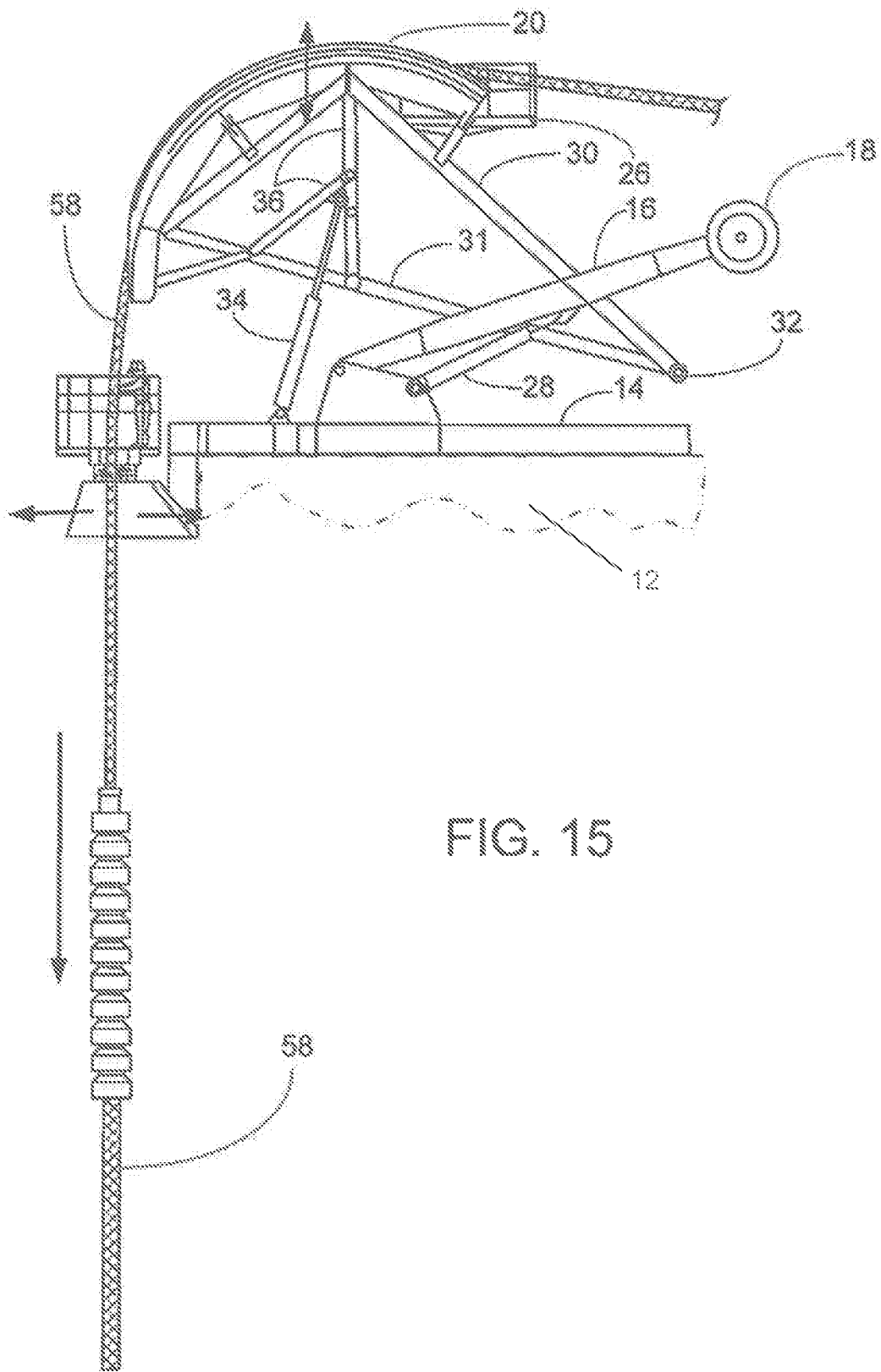
Figure 16:
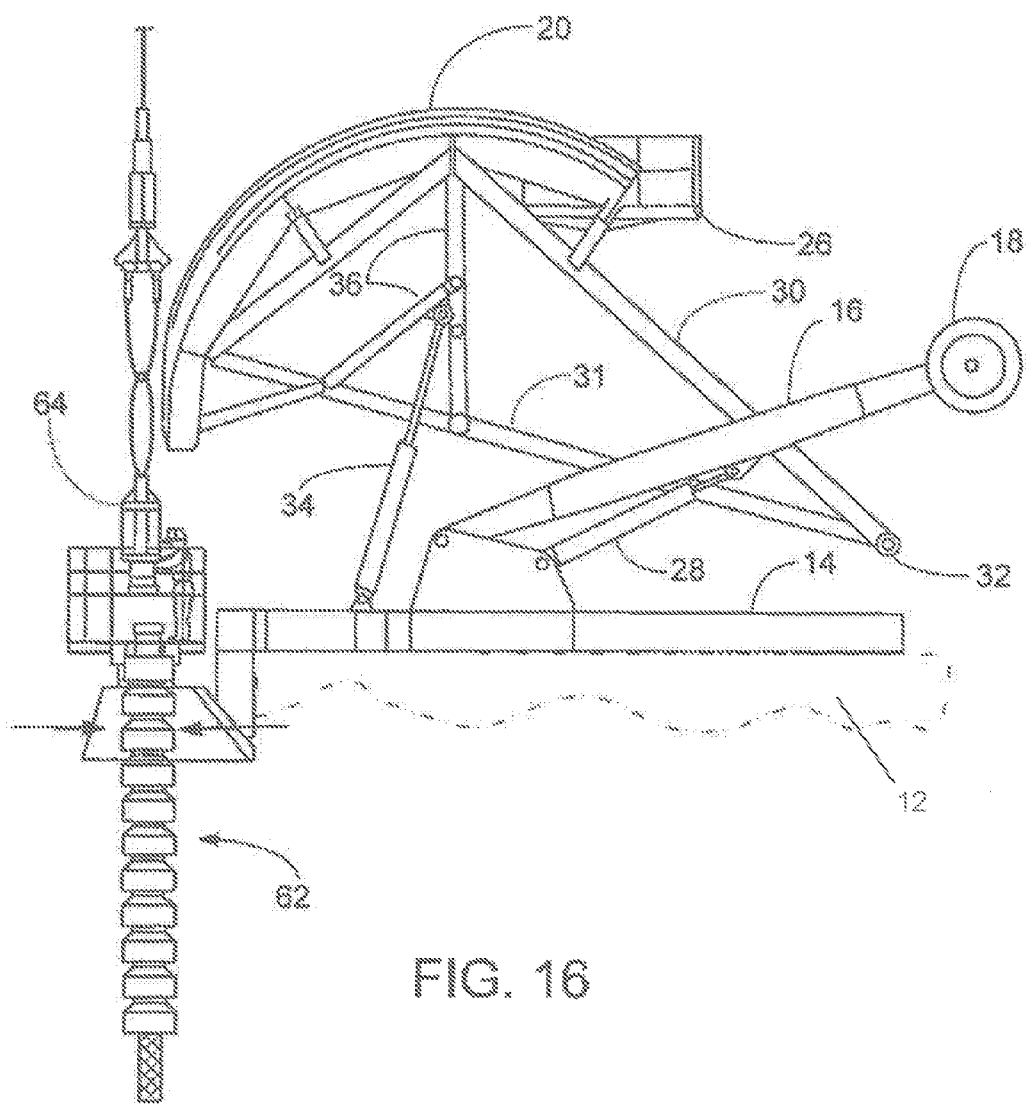
Figure 17:
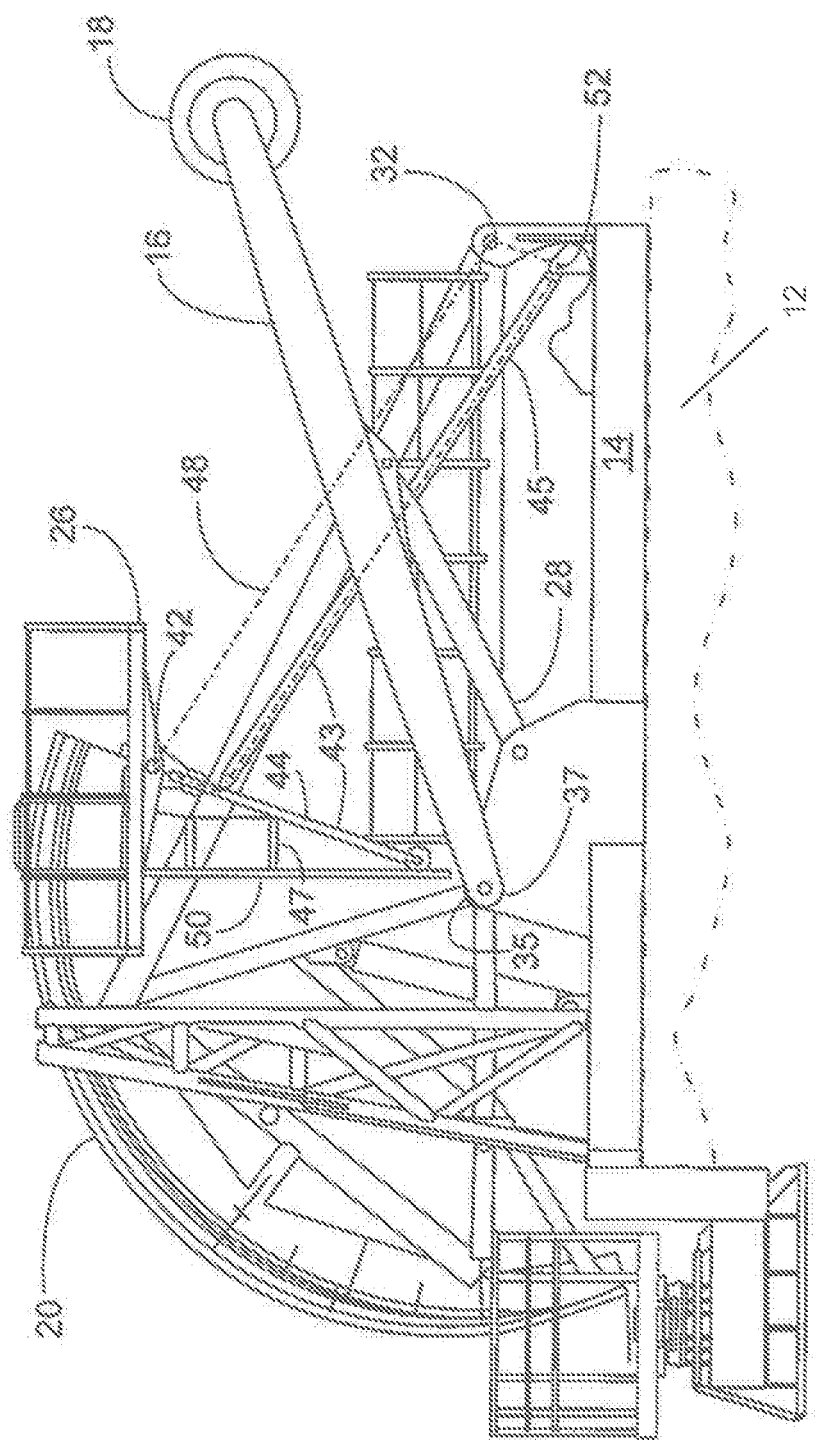
FIGS. 17 and 18 illustrate the support of the movable work platform.

As seen in FIGS. 3, 6, 7, and 11-16, the A-frame 16 has two arms, with each arm pivotally mounted on the base 14. At each arm of the A-frame 16 is a hydraulic ram 28 that has one end pivotally mounted on the base 14 and the opposite end pivotally mounted on the arm of the A-frame 16. This allows selective movement of the A-frame 16 during product laying operations to obtain the optimum angle and height of product support wheel 18 for supporting and laying product. Product support wheel 18 is rotatably mounted between the arms of the A-frame at the traveling end of the A-frame 16, which is the end away from the base. The A-frame 16 may also have adjustable length arms to better accommodate a larger size variety of products and accessories attached to the products. As described below and seen in FIGS. 11 and 12, the product wheel 18 also serves as a wire rope sheave for moving items such as an end fitting 60 and a bend restrictor assembly 62 into position. As seen in FIGS. 3 and 17, the radial center of the lay chute 20 is at the pivotal connection 35 which shares a common rotation axis with the pivotal connection 37 of the A-frame 16 when the lay chute 20 is in its lower position. As best seen in FIG. 13, brace 36 A is pivotally connected, indicated by numeral 35, to long side 31 of triangular frame 30. It is seen in FIGS. 12-18 that pivotal connection 35 represents the radial center of the lay chute 20. As seen in FIG. 13, the pivotal connection 37 of the A-frame 16 serves as the axis of rotation for the A-frame. It is seen in FIG. 17 that, while the lay chute 20 is in its lower (overboarding) position, the axis of rotation through the pivotal connection 37 of the A-frame 16 is common with the axis of rotation of the pivotal connection 35 (radial center of lay chute 20).

Movable lay chute 20 receives and guides product being laid. While movable lay chute 20 preferably has a fixed radius of curvature, it is seen in FIGS. 3 and 11-18 that it is mounted for selective movement on the base 14 to change the relative position of the lay chute 20 to obtain the optimum angle and height for laying product. As best seen in FIG. 12-18, movable lay chute 20 is mounted on a triangular frame 30. The movable lay chute 20 is flared progressively and tangentially aligned with the curvature of the fixed chute 24. The geometry of the lay chute 20 allows the product to be radius controlled with the lay chute 20 in any position.

The long side 31 (best seen in FIG. 12-16) of the triangular frame 30 is pivotally mounted (indicated by numeral 32) on the base 14. For ease of illustration and aid in understanding the invention, the pivot connection 32 is illustrated separately from the base 14 in FIG. 12-16. A hydraulic ram 34 has one end connected to the base 14 and the opposite end connected to a brace 36 on the triangular frame 30. A sliding chute support 38 (seen in FIGS. 3 and 18) has its lower end rigidly attached to the base 14 while its upper end slidably receives the lay chute 20. The support 38 stabilizes the lay chute 20 in the horizontal direction. A curved rail on the support 38 is preferably centered at the rotation point of the lay chute 20 to provide support at any achievable position of the lay chute 20. The combination of the pivot connection 32, the hydraulic ram 34, and chute support 38 allow selective, stable movement of the lay chute 20 during product laying operations as required for supporting the product and movement of equipment such as pipe line end terminations or branches attached to the product.

As seen in FIG. 8, the sides of the lay chute 20 are provided with water spray nozzles 40 that serve to cool the product as it slides on the surface of the chute 20. While only one nozzle 40 is shown in the cross section of FIG. 8 on each side of the lay chute 20 for ease of illustration, it should be understood that a series of water nozzles 40 are preferably provided along the length of the lay chute 20.

As seen in FIG. 8, the surface of the lay chute 20 in contact with the product is preferably curved (concave) for better retention and guidance of the product. As seen in FIGS. 8 and 9, the surface of the lay chute 20 in contact with the product is also preferably lined with a friction reducing material 46 such as polymeric sheeting.

The movable hang off clamp/work table 22, best seen in FIGS. 3-5 and 10-18, is split into two halves that include the clamp 54 and work surface 56. The fixed chute 24 is also attached to the lower portion of each half of the clamp/work table 22. The clamp 54 is used to hold end fittings or other accessories in place during the makeup of mid-line connections (flanged connections between two segments of product). The clamp 54 is shown open in FIG. 4 and closed in FIG. 5. The clamp 54 slides open and closed symmetrically about the centerline of the device.

The fixed chute 24 is curved outward from top to bottom and designed to protect the product from contact with the hang off clamp supporting structure, thus allowing the invention to lay product in the horizontal direction as seen in FIGS. 10 and 11. FIGS. 10 and 11 illustrate, both vertical and horizontal laying of product.

Figure 18:
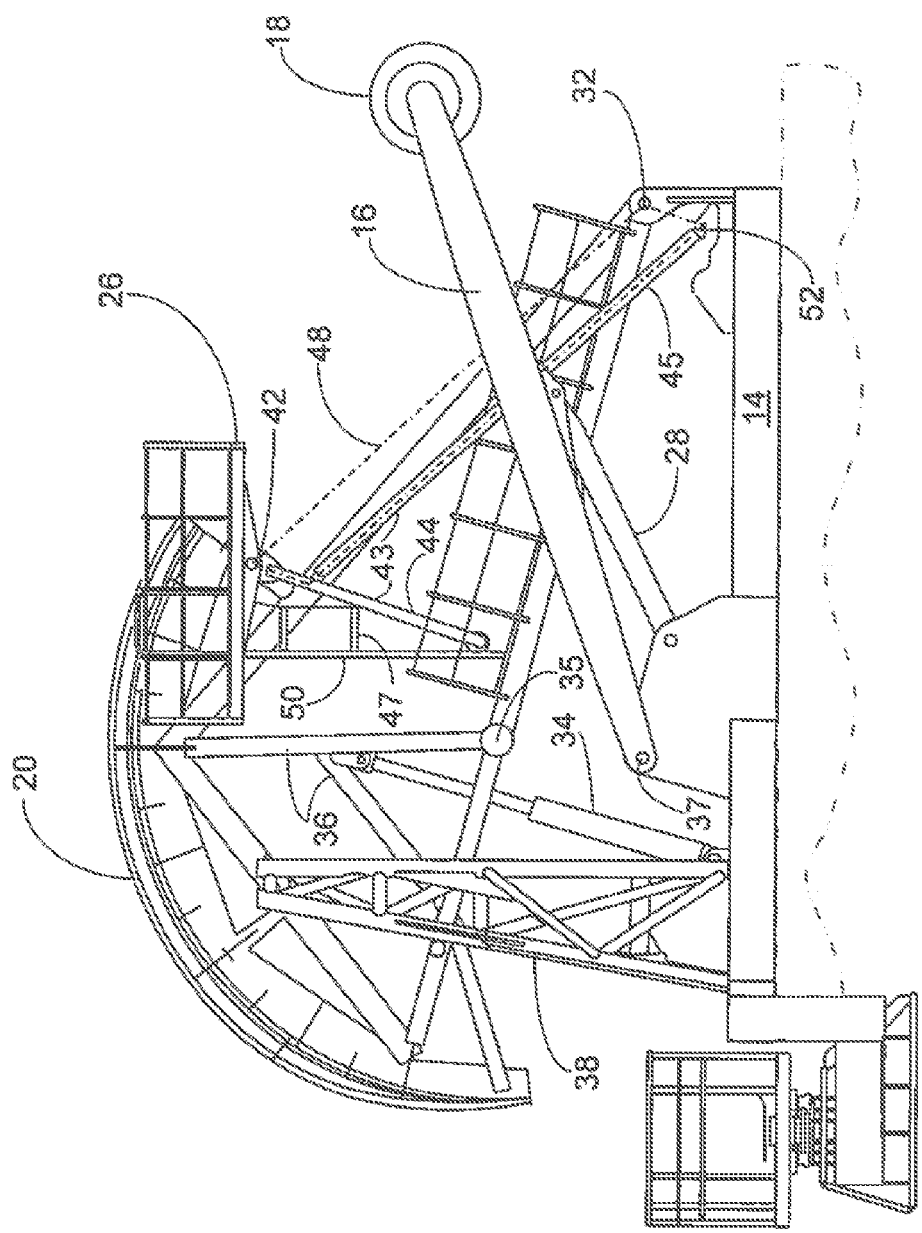

The movable work platform 26, best seen in FIGS. 17 and 18, pivots about a fixed point 42 on the lay chute 20 and is kept horizontal by means of a linkage 43 that completes an effective mechanical parallelogram. The effective mechanical parallelogram, indicated by dashed line 48, is created by the stairs 47, a linkage, and pivot point 42. The linkage 43 is comprised of two arms 44 and 45. A first, short arm 44 extends down to and is pinned at the bottom of the stair support strut 50. A second, long arm 45 is pivotally attached at one end to the first, short arm 44 below pivot point 42 and pivotally attached at its second end to the frame 14 as indicated by numeral 52. The COG (Center Of Gravity) of the work platform 26 will cause the linkage 43 to work in compression to keep the platform 26 level. For example, a person standing on the platform 26 may cause the COG to shift to the right, and cause the linkage 43 to work in tension.

Figure 14:
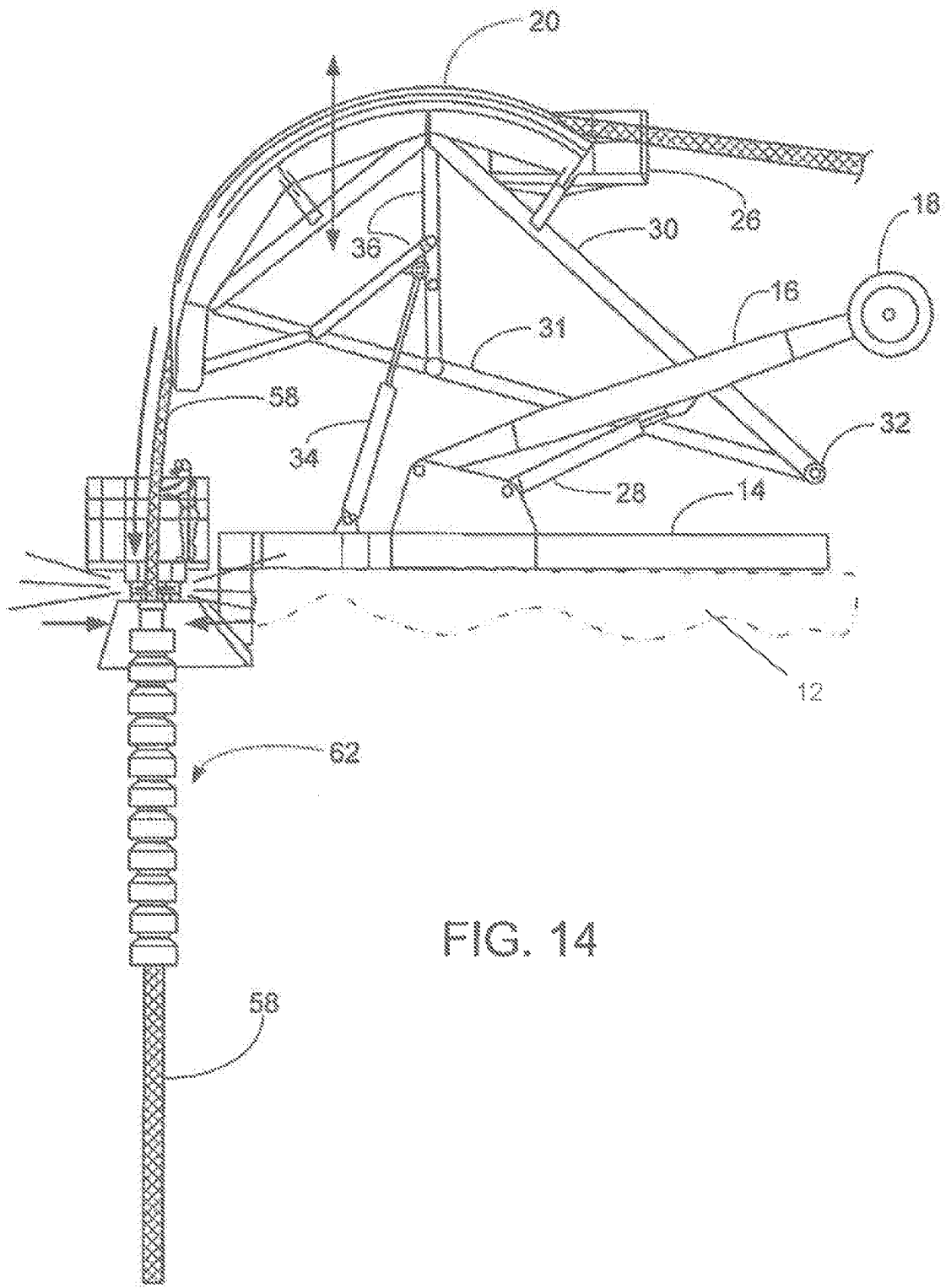

In operation, the product 58, which may be an item such as a pipe or umbilical line, is directed from a loaded position on the vessel 12 over the support wheel 18, onto the lay chute 20, and then down through the movable hang off clamp/work table 22. During movement of the product, the water spray nozzles 40 on the lay chute 20 are used to reduce friction and protect the product and the lay chute. As seen in FIGS. 6, 7, and 11-16 the positions of the A-frame 16 and movable lay chute 20 are adjusted as required to obtain the optimum angle for movement of the product. This can be especially important when the product is pipe which must be maintained within certain specifications relative to its bend radius. The different positions are also used for movement of accessories such as pipeline end terminations, bend restrictor elements, and umbilical termination assemblies. FIG. 11 illustrates the use and movement of the A-frame 16 and movable lay chute 20 to move the end of an umbilical line and its end fitting 60 into position above the movable hang off clamp/work table 22 such that the end fitting 60 does not contact and damage the movable lay chute 20. FIG. 12 illustrates the movement of a bend restrictor assembly 62 to the hang off clamp/work table 22. FIGS. 13-15 illustrate the use of the hang off clamp/work table 22 to support the product 58 and bend restrictor assembly 62 in place for attaching additional product 58 and then lowering the combination. FIG. 16 illustrates the use of the hang off clamp/ work table to retain a bend restrictor assembly 62 in place for the attachment of an end termination 64.

The invention provides the following advantages.

The invention can be lifted as a single unit and powered by a single hydraulic power unit (HPU).

This significantly reduces the mobilization time onto vessels of opportunity by reducing the scope and complexity of the physical work, as well as simplifying the engineering of the interfaces.

The integrated support base guarantees the device will function properly and safely no matter where it is installed.

The positions and sizes of all the components are optimized to enable maximum work space below the movable lay chute when needed, and reduces the required length of the A-frame, further reducing the loads in the A-frame since the movable lay chute can be lowered to an optimal position for its use.

The option for an adjustable length A-frame within the strength capacity of the integrated support base increases the quantity of potential work.

The compact design enables the invention to be installed on a larger number of available vessels.

The integrated A-frame provides a means of over boarding up to the maximum load of the device and enables product installation from vessels that would have otherwise been passed over due to insufficient crane capacity.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

What is claimed as invention is:

1. A modular, portable product lay arrangement for an offshore vessel, comprising:
   a. a base;
   b. a lay chute movably mounted on the base;
   c. an A-frame pivotally mounted on the base such that the A-frame has a pivoting end and a traveling end, with the A-frame having an axis of rotation that is common with the radial center of the lay chute when the lay chute is in a lower position;
   d. a combined hang off clamp and work table mounted at one end of the base; and
   e. a fixed chute attached to the hang off clamp and work table.

2. The arrangement of claim 1, wherein:
   a, the movable lay chute is mounted on a frame;
   b. the frame has one end pivotally mounted on the base; and
   c. means for selectively moving the frame and the lay chute is attached to the base and the frame.

3. The arrangement of claim 1, further comprising a combined product support wheel and wire rope sheave rotatably mounted on the traveling end of the A-frame.

4. The arrangement of claim 1, further comprising a movable work platform positioned above the base and adjacent the lay chute.

5. The arrangement of claim 1, wherein the combined hang off clamp and work table is movably attached to the base for selectively opening and closing for allowing movement of the product or supporting the product.

6. A modular, portable product lay arrangement for an offshore vessel, comprising:
   a. a base;
   b. a lay chute supported by a frame movably mounted on the base;
   c. an A-frame pivotally mounted on the base such that the A-frame has a pivoting end and a traveling end, with the A-frame having an axis of rotation that is common with the radial center of the lay chute when the lay chute is in a lower position;
   d. a combined product support wheel and wire rope sheave rotatably mounted on the traveling end of the A-frame;
   e. a combined hang off clamp and work table mounted at one end of the base; and;
   f. a fixed chute attached to the hang off clamp and work table.

7. The arrangement of claim 6, wherein:
   a. the frame supporting the lay chute has one end pivotally mounted on the base; and
   b. means for selectively moving the frame and the lay chute is attached to the base and the frame.

8. The arrangement of claim 6, further comprising a movable work platform positioned above the base and adjacent the lay chute.

9. The arrangement of claim 6, wherein the combined hang off clamp and work table is movably attached to the base for selectively opening and closing for allowing movement of the product or supporting the product.

10. A modular, portable product lay arrangement for an offshore vessel, comprising:
    a. a base;
    b. a lay chute supported by a frame movably mounted on the base;
    c. an A-frame pivotally mounted on the base such that the A-frame has a pivoting end and a traveling end, with the A-frame having an axis of rotation that is common with the radial center of the lay chute when the lay chute is in a lower position;
    d. a combined product support wheel and wire rope sheave rotatably mounted on the traveling end of the A-frame;
    e. the frame supporting the lay chute having one end pivotally mounted on the base;
    f. means for selectively moving the frame and the lay chute;
    g. a movable work platform positioned above the base and adjacent the lay chute;
    h. a combined hang off clamp and work table mounted at one end of the base; and
    i. a fixed chute attached to the combined hang off clamp and work table.

11. The arrangement of claim 10, wherein the combined hang off clamp and work table is movably attached to the base for selectively opening and closing for allowing movement of the product or supporting the product.

* * * * *